(12) United States Patent
Persson

(10) Patent No.: US 9,001,137 B2
(45) Date of Patent: Apr. 7, 2015

(54) TECHNIQUE FOR GPU COMMAND SCHEDULING

(75) Inventor: Per Persson, Södra Sandby (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 338 days.

(21) Appl. No.: 13/641,612

(22) PCT Filed: Apr. 26, 2011

(86) PCT No.: PCT/EP2011/056546
§ 371 (c)(1),
(2), (4) Date: Nov. 7, 2012

(87) PCT Pub. No.: WO2011/134942
PCT Pub. Date: Nov. 3, 2011

(65) Prior Publication Data
US 2013/0057563 A1    Mar. 7, 2013

Related U.S. Application Data

(60) Provisional application No. 61/332,882, filed on May 10, 2010.

(30) Foreign Application Priority Data

Apr. 28, 2010    (EP) .................................... 10004490

(51) Int. Cl.
*G06T 1/00* (2006.01)
*G06T 15/00* (2011.01)
(Continued)

(52) U.S. Cl.
CPC ................ *G06F 9/505* (2013.01); *G06F 9/485* (2013.01); *G06F 9/4893* (2013.01); *G06T 1/20* (2013.01); *G06T 15/005* (2013.01); *Y02B 60/144* (2013.01); *Y02B 60/142* (2013.01)

(58) Field of Classification Search
CPC .................... G06F 15/00; G06F 15/16; G06T 1/00–1/0092; G06T 15/00–15/005
USPC .................................. 345/501, 502, 504, 522
See application file for complete search history.

(56) References Cited

U.S. PATENT DOCUMENTS

2005/0125701 A1    6/2005    Hensbergen et al.
2006/0146056 A1*   7/2006    Wyatt ............................ 345/501
(Continued)

FOREIGN PATENT DOCUMENTS

EP    1978483 A1    10/2008

OTHER PUBLICATIONS

Chia-Ming, Chang et al.; "Energy-saving Techniques for Low-Power Graphics Processing Unit", SOC Design Conference, 2008, ISOCC '08 International, IEEE, Piscataway, NJ, USA Nov. 24, 2008, pp. 1-242-1-245; XP031449487; ISBN: 978-1-4244-2598-3.
(Continued)

*Primary Examiner* — Jacinta M Crawford
(74) *Attorney, Agent, or Firm* — Coats & Bennett, PLLC

(57) ABSTRACT

A technique for scheduling the dispatching of Graphics Processing Unit (GPU) commands is described. A method implementation of this technique comprises receiving commands from a plurality of applications, buffering the received commands, and dispatching the buffered commands as a command batch towards a GPU. The dispatching is scheduled such that a GPU idle period is created between two successive command batches dispatched towards the GPU.

21 Claims, 8 Drawing Sheets

(51) Int. Cl.
  *G06F 15/00* (2006.01)
  *G06F 9/50* (2006.01)
  *G06F 9/48* (2006.01)
  *G06T 1/20* (2006.01)

(56) References Cited

U.S. PATENT DOCUMENTS

2008/0303833 A1    12/2008  Swift et al.
2008/0303834 A1*   12/2008  Swift et al. .................... 345/522
2009/0109230 A1*    4/2009  Miller et al. .................. 345/506

OTHER PUBLICATIONS

Mikhail Bautin, Ashok Dwarakinath and Tzi-Cker Chiueh, "Graphic Engine Resource Management", Proceedings of 15th Multimedia Computing and Networking Conference 2008, SPIE, Jan. 28, 2008, pp. 1-12, XP002602496, DOI: 10.1117/12.775144 Retrieved from the Internet: URL:http://link.aip.org/link/?PSI/6818/681/800/1 retrieved on Sep. 27, 2010.

Jan Lemeire et al.: "Towards Fully User Transparent Task and Data Parallel Image Processing", Image and Signal Processing and Analysis, 2009, ISPA 2009. Proceedings of 6th International Symposium on, IEEE, Piscataway, NJ, USA; Sep. 16, 2009, pp. 620-625, XP031552009, ISBN: 978-953-184-135-1.

\* cited by examiner

TECHNIQUE FOR GPU COMMAND SCHEDULING

TECHNICAL FIELD

The present disclosure generally relates to command scheduling in a heterogeneous computing environment and in particular to the scheduling of commands for a Graphics Processing Unit (GPU).

BACKGROUND

GPUs have long been used in stationary computers and are today also becoming an important technical feature of handheld devices such as mobile telephones. While originally intended for the acceleration of 3D graphics, GPUs are nowadays employed for a plethora of additional processing intensive graphics tasks such as 2D graphics rendering, composition of multiple graphics layers into a single image, image and video processing as well as user interface acceleration.

The inherent architectural parallelism makes GPUs particularly well suited for graphics tasks, but also in the field of general purpose computation there exist in many cases speed and power benefits when performing a task on a GPU rather than on a Central Processing Unit (CPU). Especially in heterogeneous embedded devices the CPU is often a critical resource, whereas the GPU is typically under-utilized. General Purpose GPUs (GPGPUs) are thus becoming increasingly widespread, and a corresponding standard (OpenCL) has recently been defined by the Khronos group.

WO 2009/111045 A1 describes a typical environmental architecture for a GPU. Graphics commands generated by client applications are asynchronously written to command buffers. A window server is configured to detect the generation of graphics commands by the client applications. The window server analyzes an individual image to determine if compositing processing is to be initiated for this image. During compositing processing the image is combined with one or more other graphics or video layers of other client applications, and corresponding compositing graphics commands are then stored in the command buffers.

A GPU driver reads sets of graphics commands from the command buffers in the order in which they were written by the client applications and the window server. The GPU driver has a batch generator module which prepares a batch of graphics commands from the graphics commands retrieved from the command buffers. Once prepared, the batch of graphics commands (corresponding to one frame of image data) is sent in a single transaction via a hardware command queue to the GPU.

The transmission of graphics command batches from the batch generator module to the GPU is controlled by a notification handler module of the GPU driver. The notification handler module receives notification messages from the GPU which indicate that the GPU is ready to receive additional commands. The notification messages are based on interrupts sent from the GPU to a CPU hosting the GPU driver.

One drawback of conventional GPU architectures such as the one described in WO 2009/111045 A1 is the fact that they do not prevent an individual application from monopolizing or even blocking the GPU. For this reason, GPU command schedulers have been proposed.

Mikhail Bautin, Ashok Dwarakinath and Tzi-Cker Chiueh: "Graphics Engine Resource Management", Proceedings of 15$^{th}$ Multimedia Computing and Networking Conference, 2008, SPIE 28 Jan. 2008, proposes a GPU command scheduler that controls a GPU command production rate of an application through its CPU scheduling priority. Specifically, GPU commands are scheduled in such a way that GPU scheduling matches resource allocation decisions of a CPU scheduler. As a result, an equal share of GPU time can be allocated to each application regardless of the application-specific demand.

A software implementation of the GPU command scheduler suggested by M. Bautin et al. comprises a dedicated command queue for each application requesting GPU resources. GPU command groups are scheduled from these "per-application" command queues using a weighted round robin scheduling policy.

It has been found that conventional GPU command scheduling approaches still suffer from certain disadvantages. For example, the scheduling is typically application-centred, which means that the specific needs and possibilities of individual GPUs are not taken into account during the command scheduling procedure.

US 2008/303833 A1 discloses a method and an apparatus for notifying a sharing display driver to update a display with a graphics frame including multiple graphics data rendered separately by multiple graphics processing units (CPUs).

Chia-Ming Chang et al.: "Energy-saving techniques for low-power graphics processing unit", International SoC Design Conference, 2008, IEEE, Piscataway, N.J., USA, discloses a GPU with energy-saving techniques, which allow to achieve high performance with low power consumption from algorithm, architecture and circuit levels.

US 2005/125701 A1 discloses a method and system for providing energy management within a processing system, which can reduce energy consumption by managing processes through intelligent scheduling of processes and in conformity with a measured level of energy use by each process.

SUMMARY

It is an object underlying the present disclosure to provide a command scheduling technique for a GPU that avoids specific disadvantages of conventional (e.g., application-centred) scheduling approaches.

According to a first aspect, a method of scheduling the dispatching of GPU commands is provided, wherein the method comprises receiving commands from a plurality of applications, buffering the received commands, and dispatching the buffered commands as a batch towards the GPU. The dispatching is based on a scheduling, the scheduling being determined to create a GPU idle period between two successive command batches dispatched towards the GPU.

In one exemplary implementation, the command batches are dispatched to a GPU driver. In this manner, the dispatching process may be decoupled from processing requests initiated by the GPU itself (see, e.g., WO 2009/111045 A1).

Scheduling the dispatching of command batches with the intention to control creation of a GPU idle period may permit the GPU to reduce its power consumption. As an example, the GPU may enter a power saving mode or even go to sleep during the idle periods thus created. The scheduling may be performed under control of an operating system. Accordingly, the operating system may gain control of the GPU processing cycles.

In order to maximize the idle periods, one or more idle period extension procedures may be implemented. One such idle period extension procedure may comprise excluding one or more of the buffered commands from being dispatched towards the GPU. To this end, the buffered commands may be analyzed in a first step. In a second step, one or more of the analyzed commands may be excluded from being dispatched towards the GPU depending on a result of the analysis.

The analysis of the buffered commands may be performed in many different ways. As an example, a graph-based analysis approach may be used. In such a graph-based analysis approach, a hierarchical or non-hierarchical graph representation of the buffered commands may be created. The graph created from the buffered commands may comprise nodes and edges. In one variant, each node represents one or more of the buffered commands that result in a specific destination surface when applied to zero, one or more source surfaces each. In this variant, each edge may link a first node representative of one destination surface with a second node representative of one source surface for the first node.

As understood herein, a surface may be an abstract entity represented by a data structure containing graphics-related information defining the surface. The graphics-related information may comprise a logical grouping of GPU commands pertaining to a specific graphics object, graphics task and/or graphics area on a display device.

As an example, each surface may have a surface extent and a surface content (that may each be represented by a corresponding data structure portion). The surface extent may be indicative of a size (e.g., height and width) and/or location of the surface content when output on a display device. The surface content, on the other hand, may be defined by at least one buffered command associated with the surface. As an example, the surface content may be defined by an intermediate representation created by executing the at least one buffered command associated with the surface. The intermediate representation may, for example, take the form of an image or a texture (e.g., of an image file conforming to the JPEG or any other graphics standard). Additionally, or in the alternative, the surface content may be defined by at least one job. Each job may include one or more of the buffered commands pertaining to a specific source surface.

In one implementation, the graph is parsed prior to each dispatching process to determine the buffered commands to be dispatched. Moreover, the graph may (at least partially) be re-created after each dispatching process. During a partial recreation of the graph, one or more previously created graph portions (e.g., sub-graphs) pertaining to buffered commands that have not changed since the last dispatching process may be re-used. Moreover, for the buffered commands that have not changed since the last dispatching process an associated intermediate representation may be created. The intermediate representation may be created by executing these commands and storing the execution result in a data structure representative of the intermediate representation.

Analyzing the buffered commands may comprise parsing the graph to determine at least one graph portion (e.g., a node or sub-graph) that can be skipped. The buffered commands relating to the graph portion that can be skipped may then be excluded from being dispatched towards the GPU. The skipped graph portion may pertain to a surface (or part of a surface) hidden by another surface. Additionally, or in the alternative, the skipped graph portion may pertain to an intermediate representation that has been generated and stored during a previous execution of the buffered commands associated with the skipped graph portion.

The scheduling may define a display update rate of a display device. As a result, the display update rate may dynamically be controlled by the scheduling. In one example, the scheduling takes into account the current processing capabilities (e.g., workload) of at least one of the GPU and CPU. If one or more intermediate representations are available, the intermediate representations may be retrieved and rendered on a display device instead of executing the buffered commands (that have been excluded from being dispatched towards the GPU) during an upcoming display update procedure. As will be appreciated, the intermediate representations consume memory resources but save processing (e.g., GPU) resources.

In a further implementation, the buffered commands may be analyzed to determine a total GPU workload associated with the buffered commands. Subject to the workload determination, a workload balancing between the GPU and at least one of another GPU and a CPU may be initiated.

The GPU commands may be received from the various applications via a GPU Application Programming Interface (API). Moreover, the command batches may be dispatched to a GPU driver in charge of feeding the GPU with the GPU commands.

According to another aspect, a computer program product is provided. The computer program product comprises program code portions which, when executed on a computing device, cause the computing device to execute the steps of any of the methods described herein. The computer program product may be stored on a computer-readable recording medium such as a permanent or re-writable memory, a CD-ROM, or a DVD. The computer program product may also be provided for download via one or more computer networks, such as the Internet, a cellular telecommunications network or a wireless or wired Local Area Network (LAN).

According to a still further aspect, a scheduler for GPU commands is provided, wherein the scheduler comprises an interface adapted to receive commands from a plurality of applications, a buffer adapted to buffer the received commands, and a controller adapted to dispatch the buffered commands as a command batch towards a GPU. The controller is configured to control the dispatching based on a scheduling, the scheduling being determined to create a GPU idle period between two successive command batches dispatched towards the GPU.

The controller may also be adapted to analyze the buffered commands and to exclude one or more of the analyzed commands from being dispatched towards the GPU depending on a result of the analysis. The controller may further be adapted to create a graph (as generally described above) from the buffered commands. The graph may then be parsed by the controller when analyzing the buffered commands to determine at least one graph portion that can be skipped. The buffered commands relating to the graph portion that can be skipped are then excluded from being dispatched towards the GPU. Several examples of graph portions that can be skipped have already been described above.

In a scenario in which the scheduling defines a display update rate, the controller may further be adapted to dynamically control the display update rate according to current processing capabilities of at least one of the GPU and a CPU. Moreover, the controller may also be adapted to analyze the buffered commands to determine the total GPU workload associated with the buffered commands, and to initiate a workload balancing between the GPU and at least one of another GPU and a CPU subject to the workload determination.

The scheduler interface for receiving GPU commands may take the form of a GPU API. Moreover, the scheduler may further comprise, or be connected to, a GPU driver adapted to receive the dispatched GPU commands. The GPU driver, in turn, may be configured to feed the GPU with the GPU commands received from the scheduler.

BRIEF DESCRIPTION OF THE DRAWINGS

In the following, the technique described herein will be discussed in more detail with reference to exemplary embodiments illustrated in the drawings, wherein FIG. 1 schematically illustrates the arrangement of a command scheduler between applications and a GPU driver/GPU in accordance with an embodiment of the technique described herein.

DETAILED DESCRIPTION

In the following description, for purposes of explanation and not limitation, specific details are set forth, such as specific device configurations and specific graphics content processing and display scenarios in order to provide a thorough understanding of the technique disclosed herein. It will be apparent to one skilled in the art that this technique may also be practiced in other embodiments that depart from these specific details.

Those skilled in the art will further appreciate that the methods, steps and functions explained herein may be implemented using individual hardware circuitry, using software functioning in conjunction with a programmed microprocessor or general purpose computer, using an Application Specific Integrated Circuit (ASIC) and/or using one or more Digital Signal Processors (DSPs). It will also be appreciated that while the following embodiments are primarily described in the form of methods and devices, the technique disclosed herein may also be embodied in one or more processing units and a memory coupled to the processing units, wherein the memory stores one or more programs that perform the steps discussed herein when executed by the one or more processing units.

Figure 1:
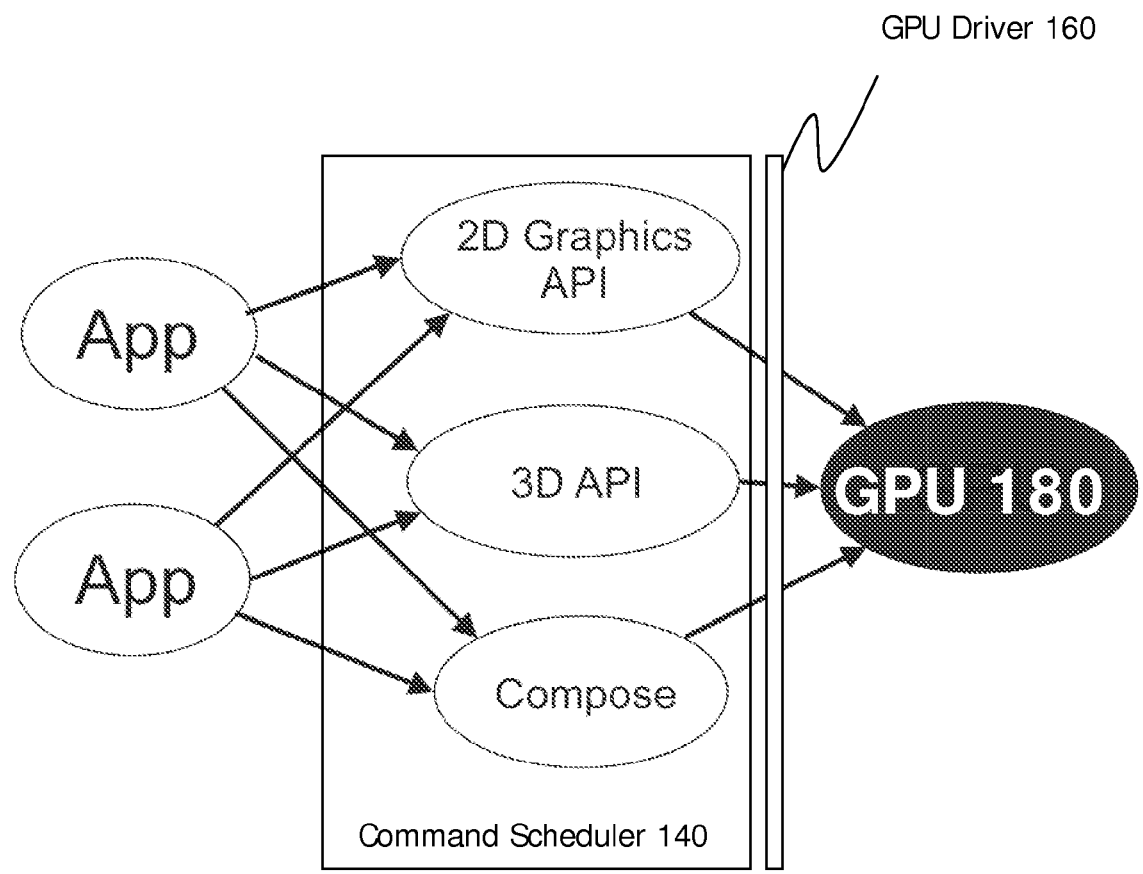

FIG. 1 illustrates an implementation scenario of a GPU command scheduler 140 according to an embodiment of the technique described herein. As shown in FIG. 1, the command scheduler 140 is located between a plurality of applications generating GPU commands on the one hand and a GPU driver 160 of a GPU 180 on the other hand. In the example illustrated in FIG. 1, the command scheduler 140 comprises a 2D graphics API as well a 3D graphics API adapted to receive corresponding GPU commands from the applications. The command scheduler 140 further comprises an interface configured to receive and/or generate a composite command derived from two or more GPU commands generated by the applications.

Instead of the GPU commands being sent directly, via the GPU driver 160, to the GPU 180 by each application, the GPU commands will be buffered by the command scheduler 140 before being dispatched in individual command batches to the GPU driver 160 and, thus, to the GPU 180. As a result, the GPU 180 will be protected from un-coordinated accesses by the various applications, which would prevent the GPU 180 from going to sleep or initiating local power saving measures, and from the ability to cooperate with a system level resource and power management scheme.

Once the GPU commands are buffered by the command scheduler 140, the buffered GPU commands can be analyzed, simplified, deleted, and so on. In particular, an Operating System (OS) may become in control over GPU usage via the command scheduler 140. The OS may thus control how load is distributed between the GPU 180 and a CPU (or a further GPU). Moreover, the OS may control the command scheduler 140 so as to achieve a cooperation of the GPU 180 with a system level resource and power management scheme. As an example, the OS may limit, via the command scheduler 140, a display update rate to lower the overall load and the system power consumption.

These and the other advantageous aspects of the command scheduler 140 will now be described in more detail with reference to FIGS. 2 to 11. The same reference numerals will be used to denote the same or similar components.

Figure 2:
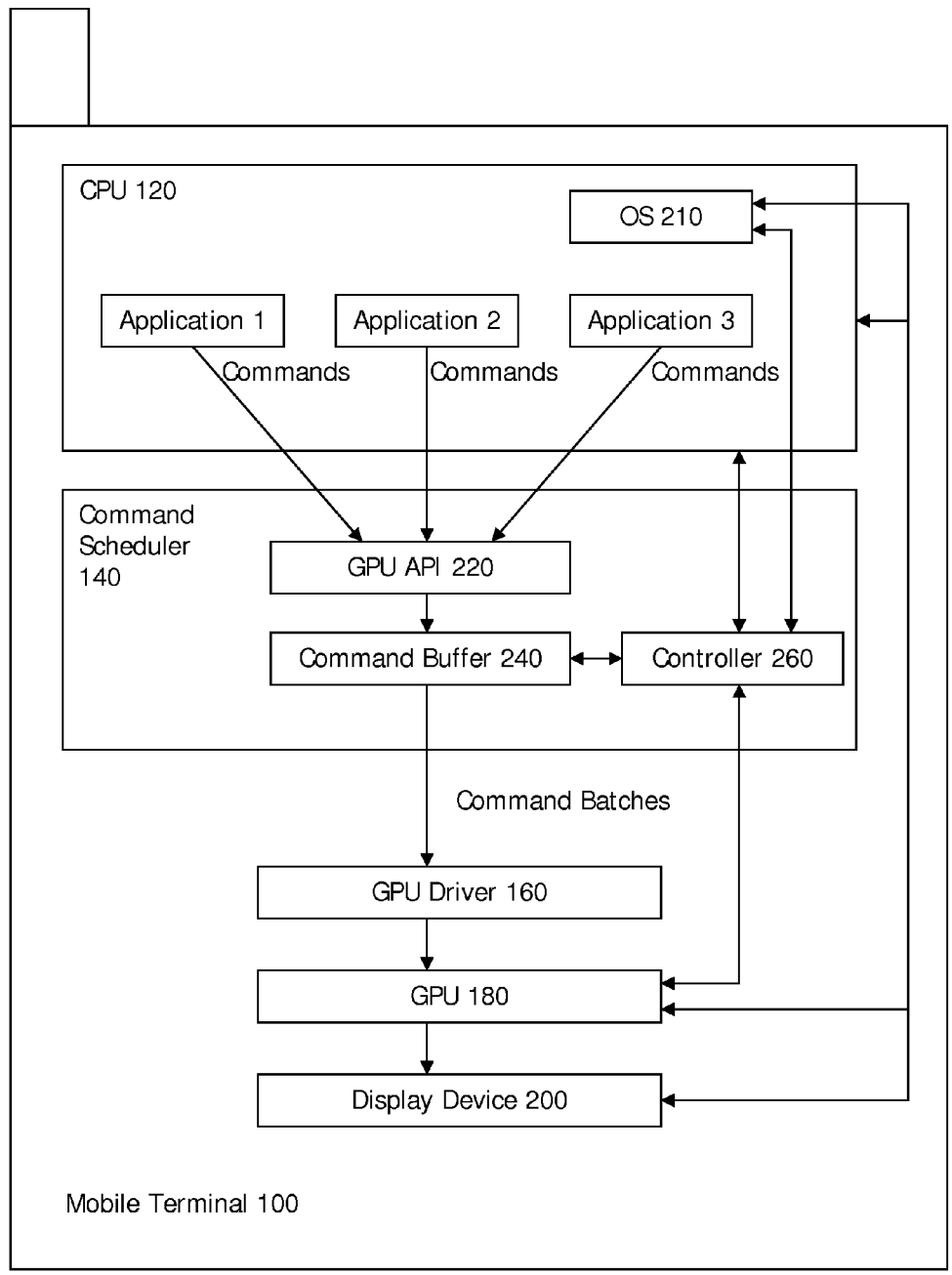
FIG. 2 schematically illustrates an embodiment of a mobile terminal comprising the command scheduler of FIG. 1.

FIG. 2 illustrates an exemplary implementation of the command scheduler 140 in a mobile terminal 100. In FIG. 2, the mobile terminal 100 is illustrated to take the form of a mobile telephone (e.g., a smartphone). It will be readily appreciated that the command scheduler 140 could also be implemented in other devices, such as personal computers or laptops.

The mobile terminal 100 illustrated in FIG. 2 comprises, in addition to the command scheduler 140, a CPU 120, a GPU driver 160, a GPU 180 as well as a display device 200. The CPU 120 is configured to execute program code of an OS 210 and of various applications. The OS 210 is configured to control the command scheduler 140. It should be noted that while the applications running on the CPU 120 are configured to generate GPU commands, the applications need not necessarily be 3D graphics applications. Rather, the applications may be also be, e.g., 2D graphics, image processing, video or general purpose applications utilizing the GPU 180 as a GPGPU to disburden the CPU 120.

As illustrated in FIG. 2, the command scheduler 140 comprises an interface towards the CPU 120 in the form of a GPU API 220. The GPU API 220 may, for example, combine the functionalities of the 2D graphics API and the 3D graphics API shown in FIG. 1. The GPU API 220 may additionally be configured to receive and/or generate composite commands as discussed above with reference to FIG. 1.

The command scheduler 140 further comprises a command buffer 240 located downstream of the GPU API 220. The command buffer 240 is configured to temporarily store the GPU commands received via the GPU API 220. In one implementation, the command buffer 240 is realized in the form of a command queue (e.g., in accordance with the FIFO paradigm).

A controller 260 of the command scheduler 140 is adapted to dispatch the commands in individual command batches from the command buffer 240 to the GPU driver 160. The controller 260 schedules the dispatching of the individual command batches such that a GPU idle period is created between two successive command batches dispatched towards the GPU 180. The scheduling of the dispatching procedures by the controller 260 may take into account information or instructions received from the OS 210. In this manner, the GPU command scheduling may be harmonized with system level resource and power management schemes.

The GPU driver 160 receives the batches of GPU commands from the command buffer 240 of the command scheduler 140. The GPU commands thus received are fed by the GPU driver 160 to the GPU 180 in accordance with conventional command feeding strategies (see, e.g., WO 2009/111045 A1).

The operation of the command scheduler 140 will now be described in more detail with reference to a method embodiment illustrated in the exemplary flow chart 300 of FIG. 3.

Figure 3:
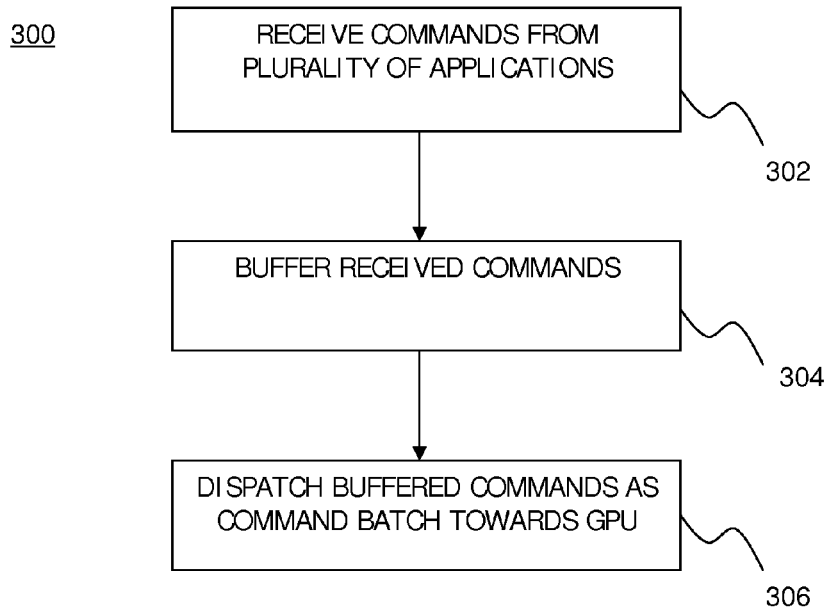
FIG. 3 is a schematic flow chart illustrating a method embodiment of a scheduling procedure.

As shown in FIG. 3, the scheduling procedure starts with the command scheduler 140 receiving GPU commands from the plurality of applications running on the CPU 120 (step 302). These GPU commands may pertain to graphics-related processing operations to update a presentation on the display device 200. Additionally, or in the alternative, the GPU commands may relate to general purpose processing operations off-loaded from the CPU 120 to the GPU 180 in accordance with, for example, a load balancing scheme enforced by the OS 210.

In a next step 304, the GPU commands received from the various applications are temporarily stored in the command buffer 240. The buffering of the GPU commands may be performed in various different ways. According to one exemplary buffering approach, the GPU commands are queued in the command buffer 240 in accordance with a command graph that facilitates an analysis of the buffered commands by the controller 260.

Figure 4:
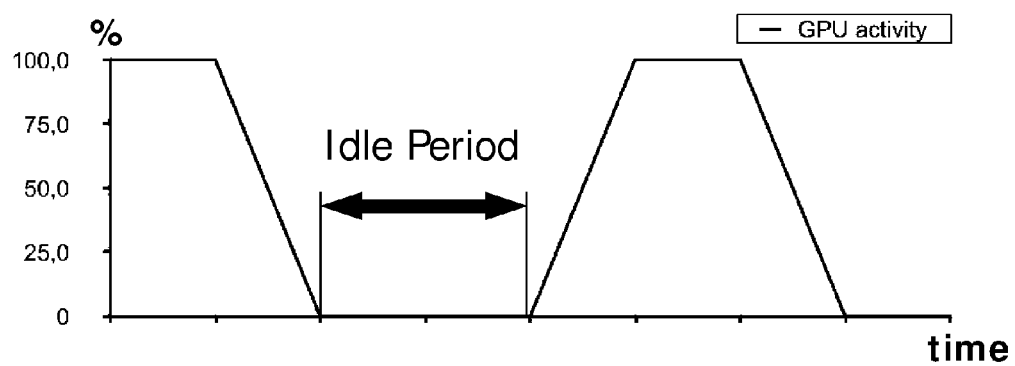
FIG. 4 is a schematic diagram illustrating the creation of a GPU idle period.

In a further step 306, the controller 260 dispatches the buffered commands as a single command batch to the GPU driver 160 and thus towards the GPU 180. The controller 260 schedules the dispatching such that a GPU idle period is created between two successive command batches. FIG. 4 illustrates such an idle period between two GPU activity periods resulting from the processing of two successive command batches. During the idle period, the GPU 180 may go to sleep or to enter a low power mode. The resulting power reduction is particularly beneficial for battery-operated devices such as the mobile terminal 100 of FIG. 2.

The idle period of FIG. 4 is the result of the command scheduler 140 protecting the GPU 180 from "random accesses" by the multiple applications running on the CPU 120. These "random accesses" result from the fact that the various applications create their GPU commands independently from each other. Consequently, there are very little chances that the period of time between two successive GPU commands from different applications will be long enough to permit the GPU 180 enter a low power mode or go to sleep. Only with the insertion of the command scheduler 140 between the applications generating the GPU commands and the GPU 180 processing the GPU commands a buffering and a batch-wise dispatching of the buffered GPU commands can be achieved with the intention to maximize the idle period. In particular, the dispatching may become independent from GPU requests as generally known from WO 2009/111045 A1).

The dispatching of the command batches from the command buffer 240 may be triggered or adjusted by the OS 210 in accordance with a system level resource or power management scheme. As an example, the OS 210 may control a display update rate of the display device 210 by controlling (e.g., dynamically adjusting) the period of time between two successive dispatching processes. Accordingly, the display update rate may be pro-actively limited by the OS 210 to limit an overall load and power consumption (e.g., in accordance with the current battery status of the mobile terminal 100).

Figure 5:
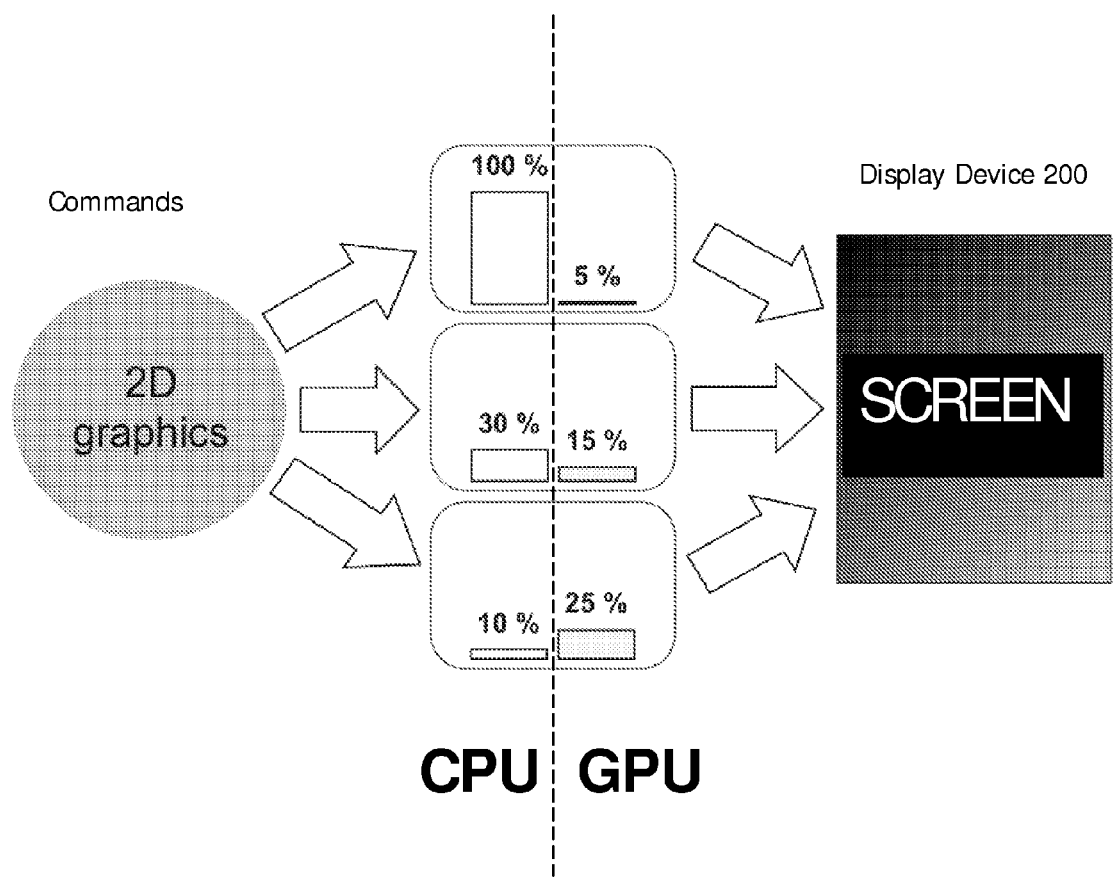
FIG. 5 is a schematic diagram illustrating a workload balancing procedure between a GPU and a CPU for a graphics application.

Alternatively, or in addition, the OS 210 may incorporate the GPU 180 in a system level resource and power management scheme by allowing for a load balancing between the CPU 120 and the GPU 180 at run-time as generally illustrated in FIG. 5. As shown in FIG. 5, the processing of exemplary 2D graphics commands may be distributed between the CPU 120 and the GPU 180 depending on the current system load The workload distribution scenario illustrated in the upper diagram of FIG. 5 illustrates the "traditional" way of rendering 2D graphics relying solely on the CPU 120 and using the GPU 180 only for 2D graphics command compositing. When system workload increases, a fair processing amount may be moved from the CPU 120 to the GPU 180 as shown in the diagram in the middle of FIG. 5. Thereby the CPU load is reduced to 30% compared to the approach illustrated in the top diagram. The GPU load goes up, but not as much as the CPU load is reduced since only processing tasks for which the GPU 180 has been optimized (e.g., tasks that require parallel processing) are moved to the GPU 180.

In the lower diagram, GPU use is maximized while CPU use is minimized. This approach includes also moving tasks from the CPU 120 to the GPU 180 that are not particularly well suited for the GPU 180. As a result, the total efficiency gain is lower compared to the transition from the top diagram to the diagram in the middle.

In the workload distribution scenario illustrated in the top diagram, the CPU 120 is likely to become a possible bottleneck, whereas in the bottom diagram the GPU 180 might become the bottleneck. The proper workload balancing between the CPU 120 and the GPU 180 will be performed at run-time.

It should be noted that the scenario shown in FIG. 5 illustrates only one of many client applications requesting CPU and GPU processing resources. In addition to the 2D graphics application illustrated in FIG. 5, 3D graphics applications and other graphics or non-graphics applications may request corresponding processing resources at the same time as the 2D graphics applications exemplarily illustrated in FIG. 5.

Figure 6:
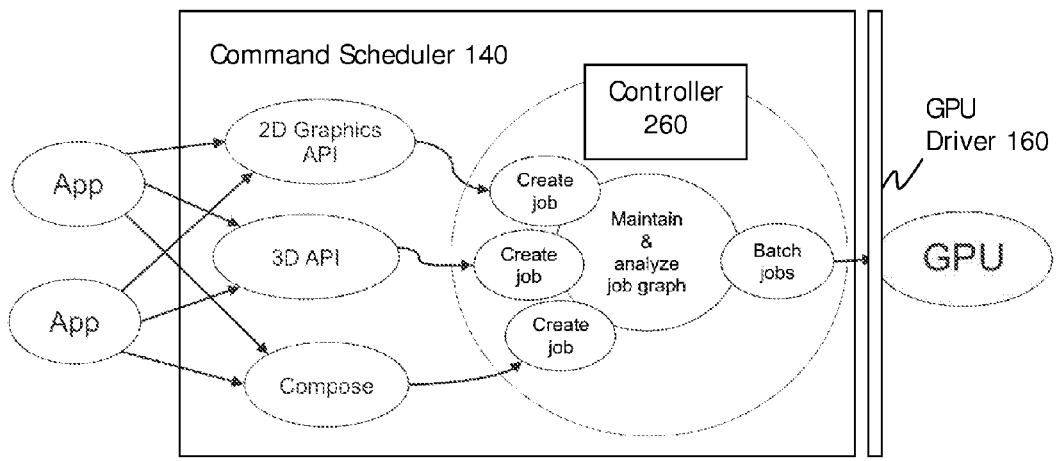
FIG. 6 is a schematic diagram illustrating the creation of a job graph.

In the following, a graph-based approach to maximize the idle period between two successive command batches will be described with reference to FIGS. 6 to 11. As shown in FIG. 6, which is an extension of the embodiments shown in FIG. 1, the graph-based functionalities of the command scheduler 140 are provided by the controller 260. Specifically, based on the commands currently stored in the command buffer 240, the controller 260 creates jobs. Based on the jobs, the controller 260 creates and maintains a hierarchical job graph. The job graph may (at least partially) be re-created after each dispatching process based on the commands that have newly arrived in the command buffer 240.

Once the job graph has been created, it is analyzed by the controller 260 to determine if any of the currently buffered commands can be excluded from being dispatched with the next command batch towards the GPU 180. As will be readily appreciated, excluding one or more of the buffered commands from being dispatched to the GPU will extend the GPU idle period and thus help to reduce GPU power consumption.

Figure 7:
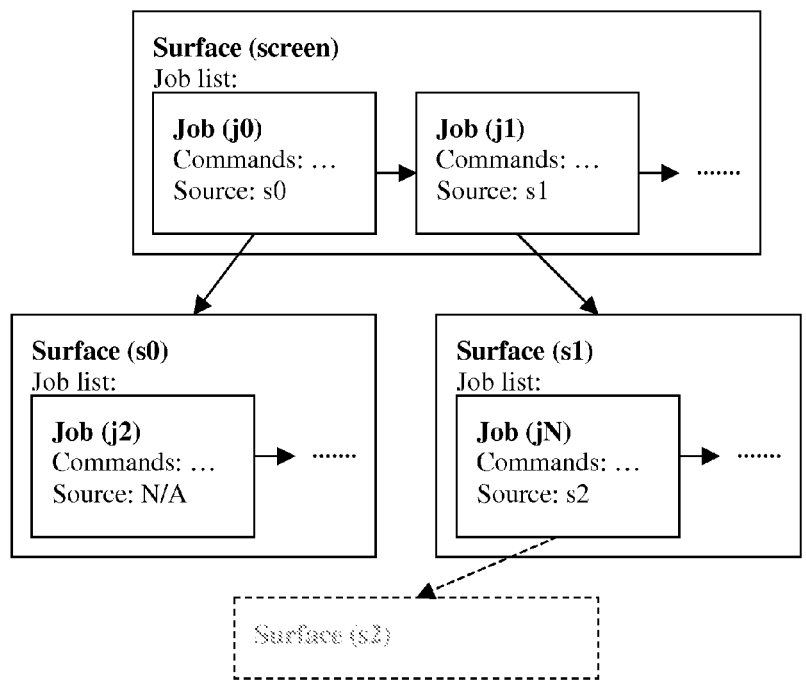
FIG. 7 is a schematic diagram illustrating the content of a job graph.

FIG. 7 illustrates an embodiment of a hierarchical job graph created by the controller 260 for a set of buffered commands. In brief, the job graph comprises nodes (also called surfaces) and edges (or vertices) linking the surfaces. Each surface is associated with one or more jobs, and each job is defined by one or more of the commands currently contained in the command buffer 240. A surface may alternatively be defined by a so-called intermediate representation resulting from an execution of its associated jobs. The root surface is denoted as screen and represents the total display area of the display device 200.

In general, a surface can be regarded as an abstract entity (e.g., a data structure) defining a surface extent property and a surface content. The surface extent may simply be indicative of the size (e.g., the width and height) and, optionally, the location of the surface content when rendered on the display device 200. The surface extent may be defined by a polygon. The polygon may be defined using normalized coordinates together with a transformation matrix which allows to transform the normalized coordinates into custom coordinates of device or user space coordinate systems.

Surface content may be described by an ordered list of jobs, each of which optionally having a reference ("edge") to another surface, thus forming a directed graph. Alternatively, the content may be described by an intermediate representation (typically an image or texture) created by executing the list of jobs rooted in the surface (potentially recursing into a constituent surface). The intermediate representation can thus be regarded as a property of the surface, representing the outcome of executing the associated job list. Once the intermediate representation has been created, it may be stored for later re-use and need not be re-created unless there is a change in the underlying jobs or surfaces during a future display update cycle.

In a similar manner, a job can be regarded as a data structure defining one or more of the following data items:

1) a sequence (ordered set) of one or more GPU commands currently stored in the command buffer 240 and associated data (such as data indicative of edges, etc.);

2) a destination surface (i.e., a surface affected by an execution of the GPU command associated with this job);

3) an optional source surface to which acts as input to the job is applied; and 4) an extension (e.g., a bounding polygon indicating the area to which the job applies).

Figure 8:
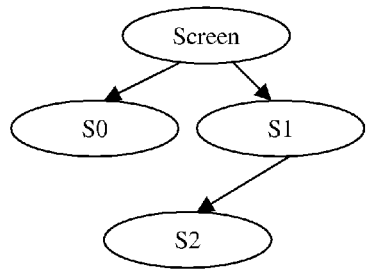
FIG. 8 illustrates a simplified representation of a job graph.

The complex job graph of FIG. 7 can be simplified as illustrated in FIG. 8, and such simplified representations will in the following be discussed in more detail to illustrate the concepts of sub-graphs ("graph portions"), common sub-graphs and the relationship between sub-graphs and intermediate representations.

Figure 9:
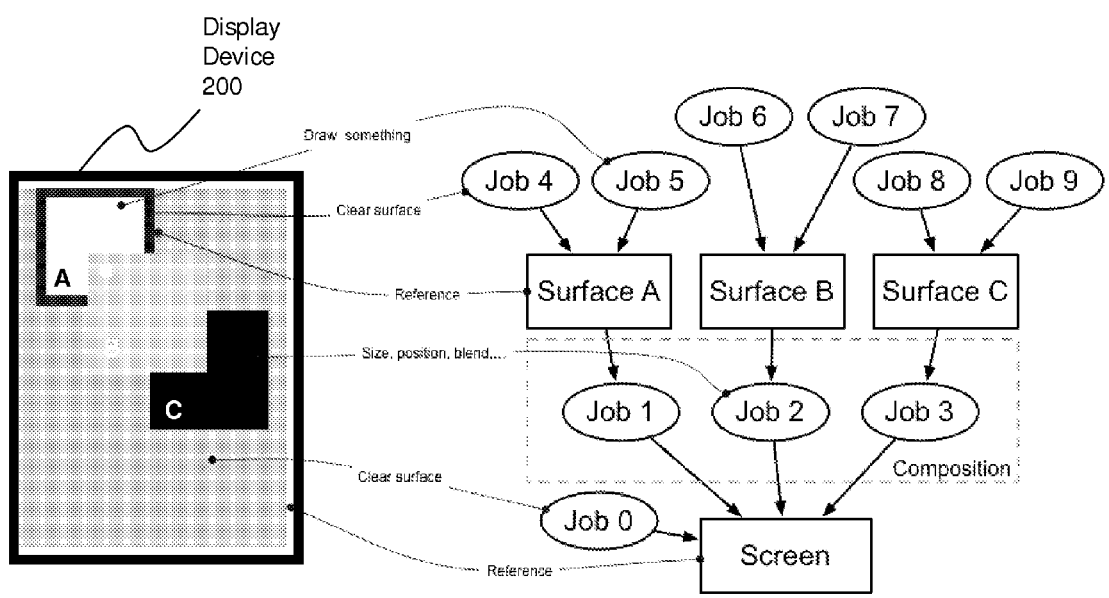
FIG. 9 illustrates a first example of a job graph and an associated rendering result of a display screen.

FIG. 9 illustrates the association between multiple jobs grouped into a job graph on the one hand and a screen giving rise to a particular rendering on the display device 200 on the other hand. As illustrated in FIG. 9, the jobs may relate to graphics commands pertaining to clearing surface content, drawing surface content, sizing surface content, positioning surface content, blending surface content, and so on. In total, three different surfaces A, B and C are defined, and the individual jobs are associated with individual ones of the surfaces.

Figure 10:
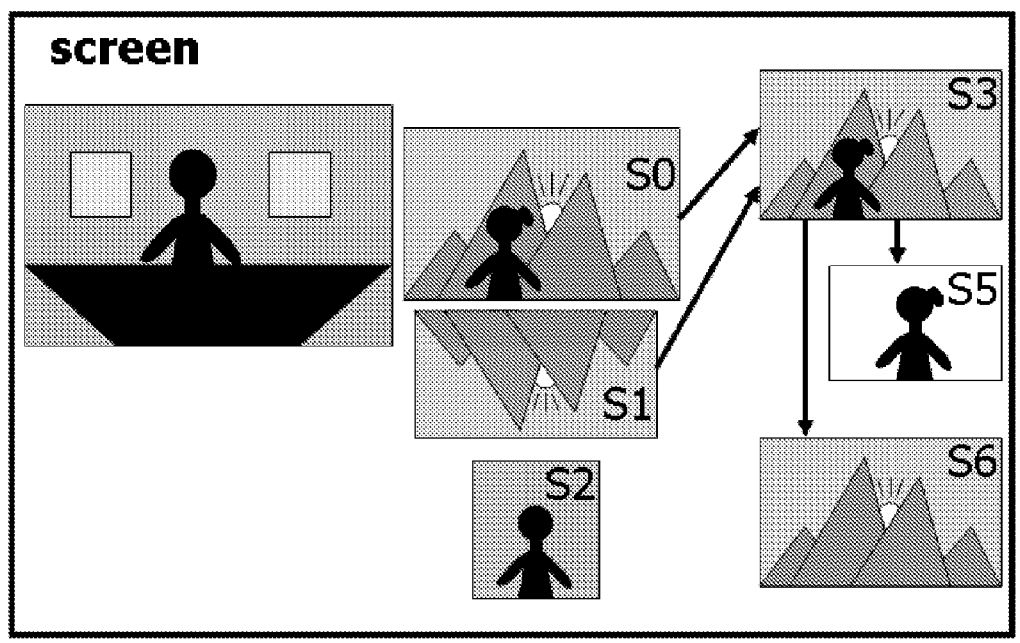
FIGS. 10 and 11 illustrate a second example of a job graph and an associated rendering result of a display screen.
Figure 11:
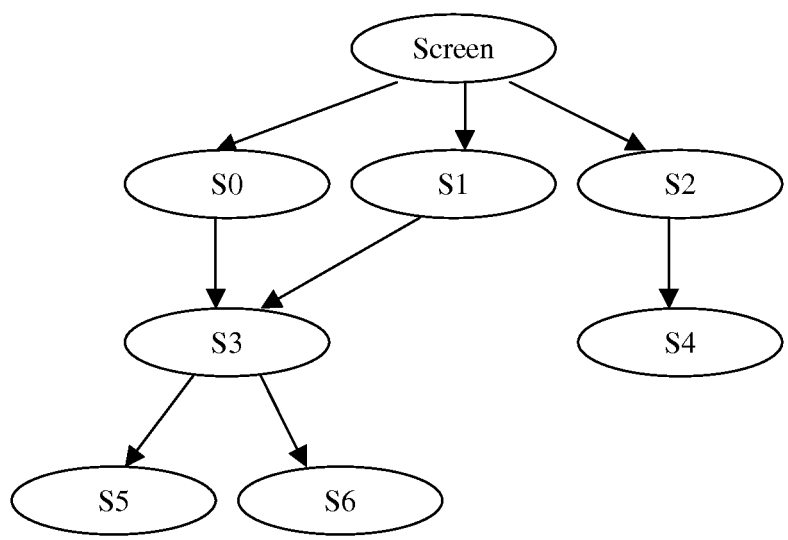

FIGS. 10 and 11 illustrate a further example between the relationship of content rendered by the display device 200 (see FIG. 10) and the corresponding job graphs (FIG. 11) created based on the buffered GPU commands resulting in the corresponding content rendering on the display device 200.

As illustrated in FIG. 11, seven surfaces S0 to S6 are rooted in the screen surface. The screen surface itself comprises three sub-graphs, or graph portions: S0→S3→(S6, S6), S1→S3→(S5, S6), and S2→S4. The sub-graph S3→(S5, S6) is shared by surfaces S0 and S1, and thus constitutes a common sub-graph to S0 and S1. In the exemplary content rendering of FIG. 10, which is a mock-up of a video chat, S3 is an image formed by combining a foreground (S5/woman) with a background (S6/mountains), which is used by both the chat image (S0) and its reflection (S1).

Since S3 is used by both S0 and S1, and S3 is formed by combining S5 and S6, one may trade GPU processing resources (combining two images) for memory resources (storage space for S3) by rendering S3 to an intermediate representation (e.g., an image file) on first use by S0, and re-using the intermediate representation directly for S1 in one and the same display update cycle. Moreover, as long as S5 and S6 or the jobs/commands in their respective job list continue to exist in the command buffer 240, the intermediate representation could also be re-used for future display update cycles.

Once an intermediate representation has been generated and stored in an associated memory (not shown in FIG. 2), the sub-graph pertaining to the intermediate representation may be skipped during the next display update cycle, which means that the corresponding GPU commands in the command buffer 240 may be excluded from being dispatched to the GPU 180. Rather, instead of dispatching the corresponding commands to the GPU 180, the intermediate representation will be retrieved from the memory for being rendered during the upcoming display update cycle.

It should be noted that on current embedded platforms, memory can be more expensive than GPU processing resources, so that the decision whether or not to generate an intermediate representation for a common sub-graph may depend on the particular hardware architecture. Alternatively, or in addition, the decision may also be made based on the current workload of the GPU 180 and other parameters.

In general, the job graph needs to be re-created after each dispatching process based on the commands newly written into the command buffer 240 (and the dispatched commands may be deleted from the command buffer 240). In certain cases, it may, however, be possible to re-use existing portions of the previous job graph when generating the new job graph (i.e., to perform a partial update). This means that it might not be necessary to re-create the whole job graph for the upcoming display update cycle.

Given the job graph of FIG. 11, if an application changes the content of S4 by adding/removing individual jobs or changing the order of jobs, it is know a priori that sub-graphs not rooted in S2 will not be affected by the content change of S4. If, as an example, S0 and S1 have been reduced to an intermediate representation (e.g., to images), all that needs to be done to get the final rendering on the display device 200 is to render S2 and then combine it with the intermediate representations of S0 and S1 onto the screen surface as defined by the job list for the screen surface (it should be remembered that "screen" as understood herein is a surface, and not necessarily the physical screen of the display device 200). As a result of the partial update, the generation of the job graph can be simplified.

In the example discussed above, the job graph is parsed by the controller 260 to determine sub-graphs that can be skipped, so that the associated buffered commands can be excluded from being dispatched towards the GPU 180. A further possibility to exclude buffered commands from being dispatched towards the GPU 180 results from sub-graphs pertaining to a surface (or a surface portion) hidden by another surface when rendered on the display device 200.

As has been discussed above, both surfaces and jobs have an extension property which defines their bounds in the form of, for example, a polygon. Based on the extension property, it can be determined by the controller 260 if the rendering on the display device 200 by a specific surface or job will be visible or not. During this determination, the execution order of the surfaces and jobs as defined in the job graph is also considered. As stated above, jobs are stored in the job graph in the form of ordered lists, and the surfaces are hierarchically ordered in the job graph.

Consequently, if a job or surface will not contribute to a display update cycle, it may be skipped when parsing the job graph by the controller 260. The skipping of the job will leave the job in the corresponding job graph, but will prevent the associated command(s) from being dispatched towards the GPU 180. Similarly to jobs, if a surface is hidden, the hidden surface and all sub-graphs routed in it will be skipped when determining the buffered commands that are to be dispatched towards the GPU 180. The skipping of the surface and the sub-graphs rooted in it will prevent the associated commands stored in the command buffer 240 from being dispatched towards the GPU 180.

As has become apparent from the description of preferred embodiments, the technique presented herein permits to protect the GPU 180 from random accesses by multiple applications, so that GPU idle periods between two successive GPU activity periods can be created in a controlled manner. Since creation of the idle period can be controlled by OS 210, the GPU 180 can be included into a system level resource and power management scheme. Additionally, workload balancing between the GPU 180 and the CPU 120 becomes possible, and the OS 210 gains influence on the display update rate, so that the display update rate can be adapted to the current resource situation of the overall system.

As a further advantageous measure, the idle period may be extended by excluding certain commands in the command buffer 240 from being dispatched towards the GPU 180. The determination of commands that may be excluded from being dispatched towards the GPU 180 may be performed using a graph-based technique. In one implementation, the graph-based technique permits the detection of sub-graphs representative of GPU commands not effecting the rendering process on the display device 200. Such GPU commands need therefore not be processed by the GPU.

In the foregoing, principles, embodiments and various modes of implementing the technique disclosed herein have exemplary been described. The present invention should not be construed as being limited to the particular principles, embodiments and modes discussed herein. Rather, it will be appreciated that various changes and modifications may be made by a person skilled in the art without departing from the scope of the present invention as defined in the claims that follow.

The invention claimed is:

1. A method of scheduling the dispatching of Graphical Processing Unit (GPU) commands, the method comprising:
   receiving commands from a plurality of applications;
   buffering the received commands;
   creating a graph from the buffered commands;
   wherein the graph includes nodes and edges linking the nodes;
   wherein each node represents one or more of the buffered commands that result in a specific destination surface when applied to zero, one or more source surfaces each;
   wherein each edge links a first node representative of one destination surface with a second node representative of one source surface for the first node;
   dispatching the buffered commands as a command batch towards a GPU;
   wherein the dispatching is controlled based on a scheduling by an operating system executed by a Central Processing Unit (CPU) and independently from processing requests initiated by the GPU itself, the scheduling being determined to control creation of a GPU idle period between two successive command batches dispatched towards the GPU.

2. The method of claim 1:
   wherein each destination surface has a surface extent and a surface content;
   wherein the surface content is defined by an intermediate representation created by executing the at least one buffered command associated with the destination surface.

3. The method of claim 1 further comprising:
   analyzing the buffered commands;
   excluding one or more of the analyzed commands from being dispatched towards the GPU depending on a result of the analysis.

4. The method of claim 1:
   wherein analyzing the buffered commands comprises determining, through parsing, at least one graph portion that can be skipped;
   wherein the buffered commands relating to the graph portion that can be skipped are excluded from being dispatched towards the GPU.

5. The method of claim 4 wherein the graph portion that can be skipped pertains to a surface or a part of surface hidden by another surface.

6. The method of claim 4:
   wherein each destination surface has a surface extent and a surface content;
   wherein the surface content is defined by an intermediate representation created by executing the at least one buffered command associated with the destination surface;
   wherein the graph portion that can be skipped pertains to an intermediate representation that has been generated and stored during a previous execution of the buffered commands associated with the graph portion that can be skipped.

7. The method of claim 1:
   wherein the scheduling defines a display update rate;
   further comprising dynamically controlling the display update rate according to current processing capabilities of at least one of the GPU and the Central Processing Unit.

8. The method of claim 1 further comprising:
   analyzing the buffered commands to determine a total GPU workload associated with the buffered commands;
   initiating a workload balancing between the GPU and at least one of another GPU and another CPU subject to the workload determination.

9. The method of claim 1 wherein the receiving commands comprises receiving the commands via a GPU Application Programming Interface from the applications.

10. The method of claim 1 wherein the received commands are dispatched towards a GPU driver, the GPU driver configured to feed the GPU with the dispatched received commands.

11. A computer program product stored in a non-transitory computer readable medium for scheduling the dispatching of Graphical Processing Unit (GPU) commands, the computer program product comprising software instructions which, when run on a computing device, causes the computing device to:
   receive commands from a plurality of applications;
   buffer the received commands;
   create a graph from the buffered commands; wherein the graph includes nodes and edges linking the nodes; wherein each node represents one or more of the buffered commands that result in a specific destination surface when applied to zero, one or more source surfaces each; wherein each edge links a first node representative of one destination surface with a second node representative of one source surface for the first node;

control the dispatch of the buffered commands as a command batch towards a GPU based on a scheduling by an operating system executed by a Central Processing Unit (CPU) and independently from processing requests initiated by the GPU itself, the scheduling being determined to control creation of a GPU idle period between two successive command batches dispatched towards the GPU.

12. A scheduler for Graphical Processing Unit (GPU) commands, the scheduler comprising:
one or more processing circuits configured to operate as:
an interface configured to receive commands from a plurality of applications;
a buffer configured to buffer the received commands;
a controller configured to:
dispatch the buffered commands as a command batch towards a GPU;
create a graph from the buffered commands; wherein the graph includes nodes and edges linking the nodes; wherein each node represents one or more of the buffered commands that result in a specific destination surface when applied to zero, one or more source surfaces each; wherein each edge links a first node representative of one destination surface with at least one second node representative of one source surface for the first node;
wherein the controller is configured to control the dispatching based on a scheduling by an operating system executed by a Central Processing Unit (CPU) and independently from processing requests initiated by the GPU itself, the scheduling being determined to control creation of a GPU idle period between two successive command batches dispatched towards the GPU.

13. The scheduler of claim 12 wherein the controller is further configured to:
analyze the buffered commands;
exclude one or more of the analyzed commands from being dispatched towards the GPU depending on a result of the analysis.

14. The scheduler of claim 13:
wherein analyzing the buffered commands comprises determining, through parsing, at least one graph portion that can be skipped;
wherein the buffered commands relating to the graph portion that can be skipped are excluded from being dispatched towards the GPU.

15. The scheduler of claim 14 wherein the graph portion that can be skipped pertains to a surface or a part of surface hidden by another surface.

16. The scheduler of claim 14:
wherein each destination surface has a surface extent and a surface content;
wherein the surface content is defined by an intermediate representation created by executing the at least one buffered command associated with the destination surface;
wherein the graph portion that can be skipped pertains to an intermediate representation that has been generated and stored during a previous execution of the buffered commands associated with the graph portion that can be skipped.

17. The scheduler of claim 12:
wherein each destination surface has a surface extent and a surface content;
wherein the surface content is defined by an intermediate representation created by executing the at least one buffered command associated with the destination surface.

18. The scheduler of claim 12:
wherein the scheduling defines a display update rate;
wherein the controller is further configured to dynamically control the display update rate according to current processing capabilities of the at least one of the GPU and the CPU.

19. The scheduler of claim 12 wherein the controller is further configured to:
analyze the buffered commands to determine a total GPU workload associated with the buffered commands;
initiate a workload balancing between the GPU and at least one of another GPU and another Central Processing Unit subject to the workload determination.

20. The scheduler of claim 12 wherein the one or more processing circuits are further configured to operate as at least one of:
a GPU Application Programming Interface configured to receive the GPU commands from the applications;
a GPU driver configured to receive the dispatched GPU commands.

21. The scheduler of claim 12, wherein the one or more processing circuits are further configured to be connected to at least one of:
a GPU Application Programming Interface configured to receive the GPU commands from the applications;
a GPU driver configured to receive the dispatched GPU commands.

* * * * *